(12) United States Patent
Tsai et al.

(10) Patent No.: US 11,254,415 B2
(45) Date of Patent: Feb. 22, 2022

(54) AIRCRAFT WING FLAP SUPPORT

(71) Applicant: The Boeing Company, Chicago, IL (US)

(72) Inventors: Kevin Tsai, Seattle, WA (US); Kyle Johnson, Fall City, WA (US)

(73) Assignee: THE BOEING COMPANY, Chicago, IL (US)

( * ) Notice: Subject to any disclaimer, the term of this patent is extended or adjusted under 35 U.S.C. 154(b) by 270 days.

(21) Appl. No.: 16/711,995

(22) Filed: Dec. 12, 2019

(65) Prior Publication Data

US 2021/0179257 A1    Jun. 17, 2021

(51) Int. Cl.
*B64C 9/02* (2006.01)
*B64C 3/50* (2006.01)

(52) U.S. Cl.
CPC . *B64C 9/02* (2013.01); *B64C 3/50* (2013.01)

(58) Field of Classification Search
CPC .... B64C 9/02; B64C 3/50; B64C 5/08; B64C 9/18; B64C 1/26
See application file for complete search history.

(56) References Cited

U.S. PATENT DOCUMENTS

| 4,614,320 | A | 9/1986 | Rutan | |
|---|---|---|---|---|
| 8,740,151 | B1 * | 6/2014 | Rosman | B64C 1/061 244/131 |
| 2012/0160961 | A1 | 6/2012 | Curry et al. | |
| 2014/0145032 | A1 * | 5/2014 | Moselage, III | B64C 3/185 244/123.1 |
| 2015/0266562 | A1 * | 9/2015 | De Conto | B64C 9/16 244/119 |
| 2018/0065731 | A1 * | 3/2018 | Berthoud | B64C 9/02 |
| 2019/0300146 | A1 | 10/2019 | Tsai | |

FOREIGN PATENT DOCUMENTS

| FR | 849 983 A | 5/1939 |
|---|---|---|
| GB | 559 546 A | 2/1944 |

OTHER PUBLICATIONS

Extended European Search Report prepared by the European Patent Office in application No. EP 20 20 1496.5 dated Apr. 7, 2021.

* cited by examiner

*Primary Examiner* — Richard R. Green
*Assistant Examiner* — William L Gmoser
(74) *Attorney, Agent, or Firm* — McDonnell Boehnen Hulbert & Berghoff LLP

(57) ABSTRACT

An aircraft including a flap support assembly for a flap support. An aircraft includes a fuselage comprising a pressure deck, where at least a portion the pressure deck is substantially horizontal. The aircraft further includes a wing extending from the fuselage, where the wing includes a leading edge and a trailing edge. The wing additionally includes a flap assembly on the trailing edge of the wing, where the flap assembly is configured to move between an extended position and a retracted position. The aircraft further includes a flap support coupled to the flap assembly comprising a plurality of load-bearing connection points, where at least one of the load-bearing connection points is coupled to the pressure deck.

20 Claims, 8 Drawing Sheets

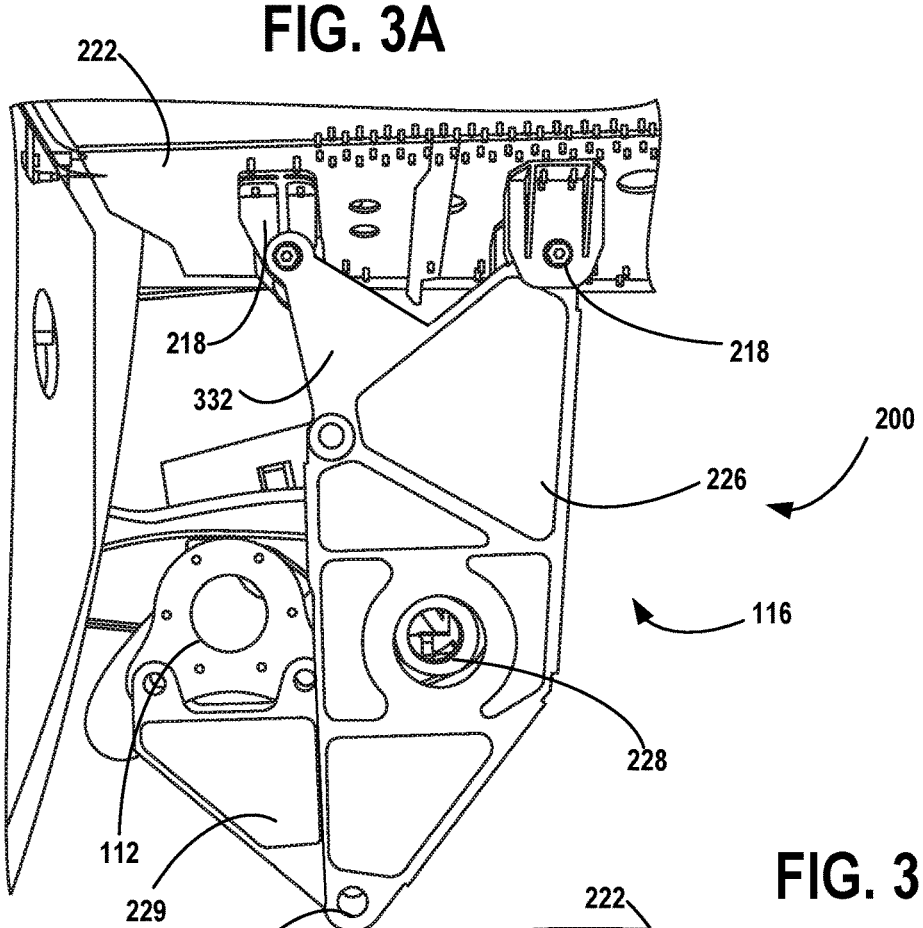
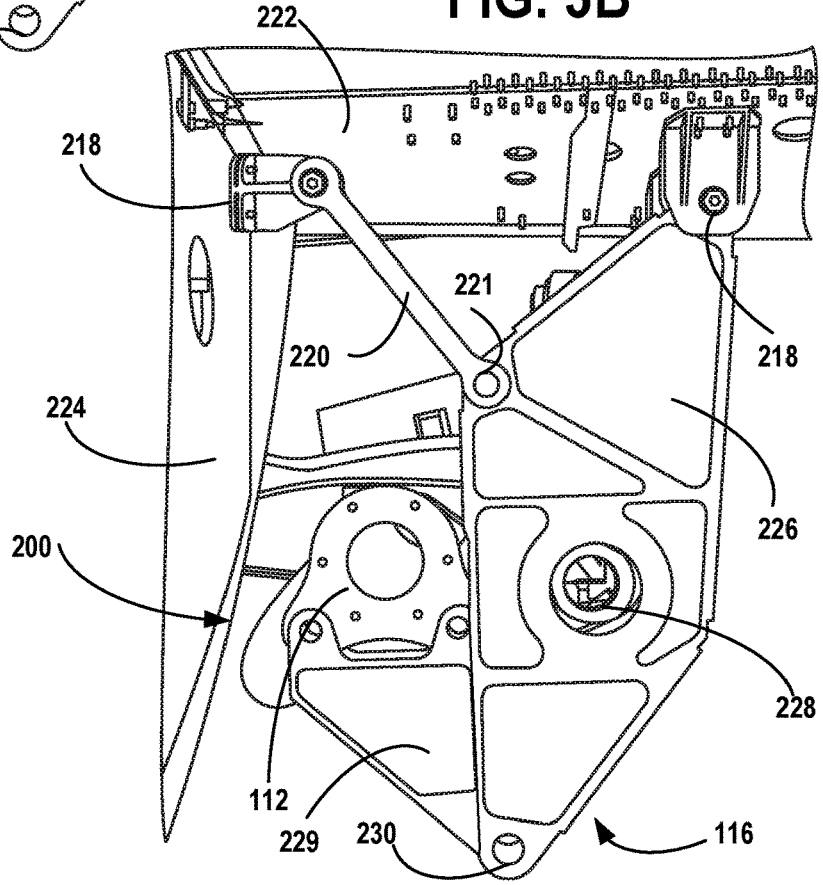

AIRCRAFT WING FLAP SUPPORT

FIELD

The present disclosure relates generally to an aircraft wing flap support.

BACKGROUND

Many aircrafts employ high lift devices, sometimes referred to as auxiliary airfoils or movable control surfaces, along the leading and trailing edges of the wings. For example, wing flaps are a common type of high lift device that are movable along the trailing edge of a wing. The flaps may be moved (e.g., retracted and extended) from the trailing edge of the wing to change the shape of the wing to generate more or less lift. The flaps are often deployed during takeoff and landing, for instance, to generate more lift at slower speeds. Aircrafts typically have one or more flap supports to help support each of the flaps on the wing.

Often, flap supports transfer loads to and are supported by various components of the aircraft, such as a landing gear beam by way of a cantilever, for example. During operation, the landing gear beam is capable of translating inboard and outboard during normal wing bending. As such, these flaps supports must account for the relative deflections of the movement of the landing gear beam.

Additionally, known flap supports may be supported by and transfer loads to multiple components of the aircraft, such as the wheel well bulkhead and the fuselage. These flap supports similarly must account for deflections of the movement of multiple aircraft components.

SUMMARY

In an example, an aircraft including a side of body flap support is described. A fuselage comprising a pressure deck, wherein at least a portion the pressure deck is substantially horizontal, a wing extending from the fuselage, wherein the wing comprises a leading edge and a trailing edge, a flap assembly on the trailing edge of the wing, wherein the flap assembly is configured to move between an extended position and a retracted position, and a flap support coupled to the flap assembly comprising a plurality of load-bearing connection points, wherein at least one of the load-bearing connection points is coupled to the pressure deck.

In another example, a system comprising a flap assembly configured to move between an extended position and a retracted position, and a flap support comprising a joint rotatably coupled to a proximal end of a link, wherein a distal end of the link is rotatably coupled to the flap assembly, and wherein rotation of the joint moves the flap assembly between the extended position and the retracted position, and a plurality of load-bearing connection points, wherein at least one of the load-bearing connection points is configured to be coupled to a fuselage pressure deck.

In another example, a method comprising rotating a joint located in a central portion of a flap support, wherein the joint is rotatably coupled to a proximal end of a link, wherein a distal end of the link is rotatably coupled to a flap assembly, wherein the flap assembly is rotatably coupled to a bottom portion of the flap support, and wherein the flap support is coupled to an aircraft pressure deck via a plurality of load-bearing connection points; and moving the flap assembly from a retracted position to an extended position, wherein at least a portion of the flap assembly is housed within the flap support while in the retracted position.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 3A is a perspective view of a flap support, according to an example implementation.

FIG. 3B is a perspective view of a flap support, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for an aircraft wing flap support are described. Namely, embodiments of the present disclosure describe a flap support supported solely or primarily by the fuselage and, more specifically, the horizontal pressure deck. The flap support includes load-bearing connection points attached to the horizontal pressure deck such that the primary load path is the horizontal pressure deck.

Figure 1:
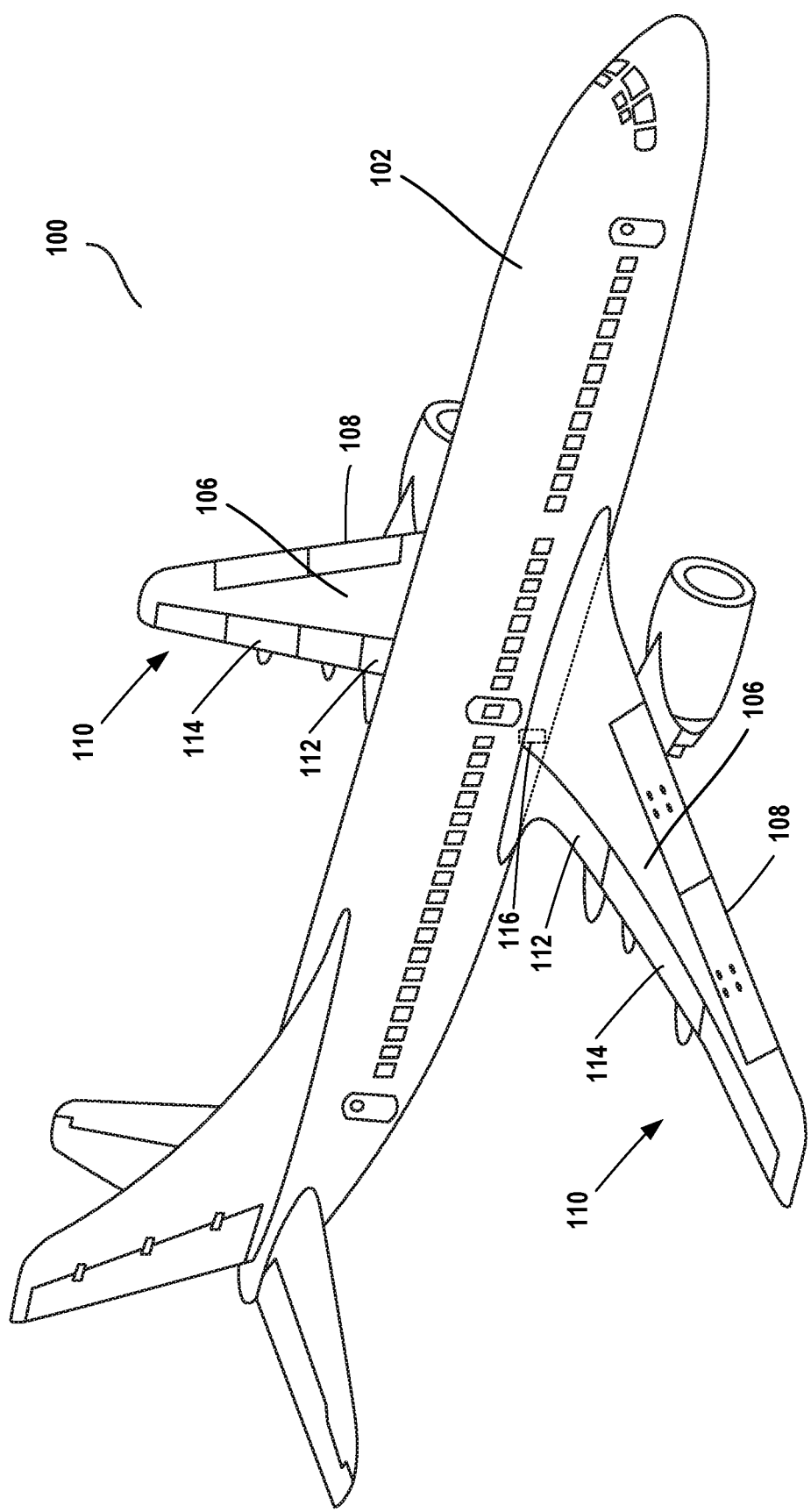
FIG. 1 is an aircraft, according to an example implementation.

Referring now to the figures, FIG. 1 is an aircraft 100 according to an example implementation. The aircraft 100 includes a fuselage 102, two aircraft wings 106 extending from the fuselage 102, an inboard flap assemblies 112 (i.e., nearest to the fuselage 102) and an outboard flap assembly 114, and a flap support 116 coupled to the inboard flap assembly 112. The two wings each include a leading edge 108 and a trailing edge 110, in which the one or more flap assemblies 112 and 114 are located on the trailing edge 110.

The fuselage 102 further includes a pressure deck, where at least a portion the pressure deck is substantially horizontal. Further, the inboard flap assembly 112 is supported by the flap support 116 which includes a plurality of load-bearing connection points (as shown in FIG. 2), where at least one of the load-bearing connection points is coupled to the pressure deck.

In some examples, flap assemblies 112 and 114 are configured to move between a retracted position and an extended position, as explained above. For example, during flight the flap assemblies 112 and 114 may be in the retracted position in which the flap assemblies 112 and 114 are in line with the aircraft wings 106, as it reduces the amount of drag. Alternatively, during takeoff and landing, the flap assemblies 112 and 114 may be moved to the extended position in which the flap assembly is moved and/or angled downward from the trailing edge 110 of the wing. Moving the inboard flap assembly 112 between the extended and retracted positions may be used to generate more or less drag and lift.

Figure 2A:
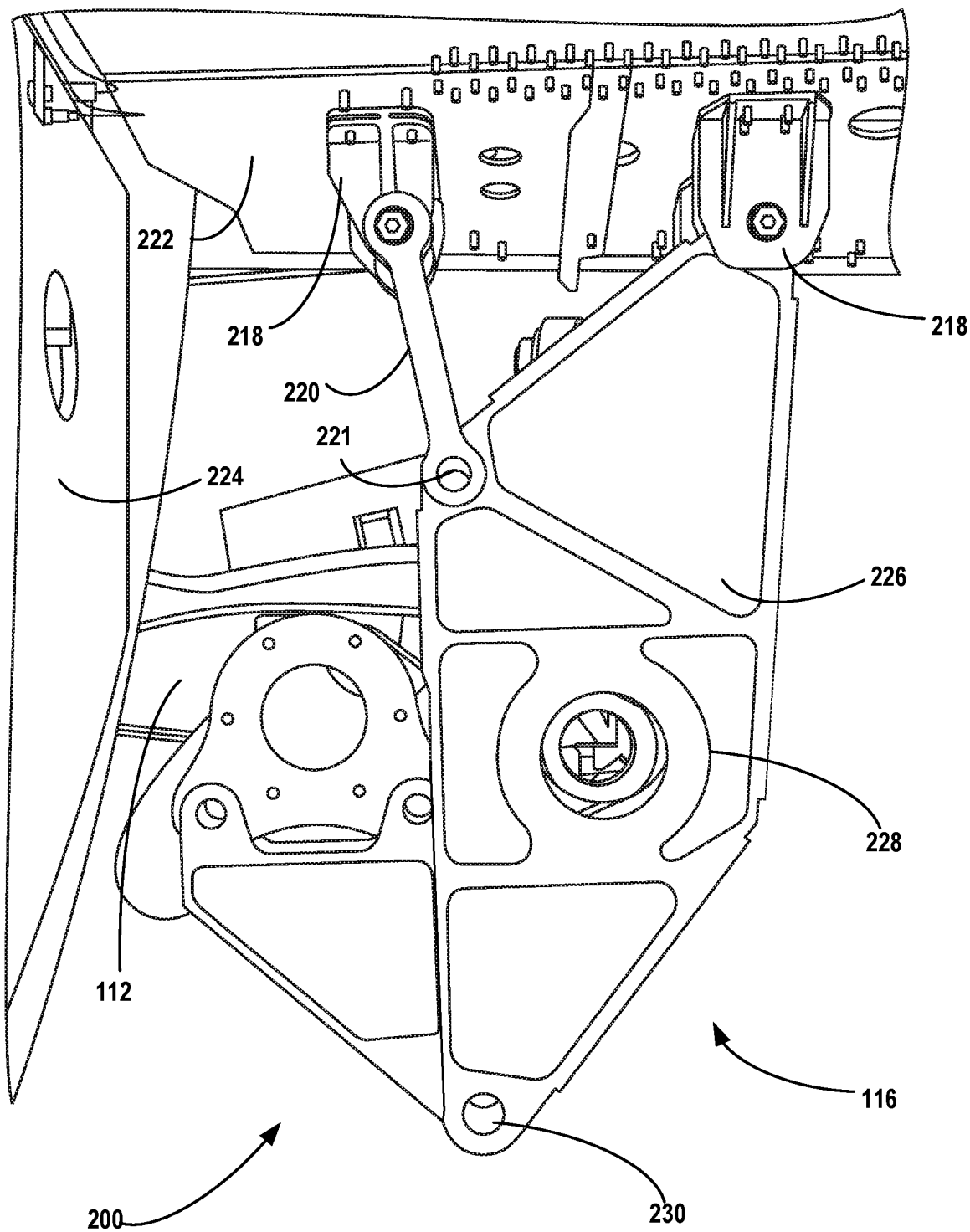
FIG. 2A is a perspective view of a flap support, according to an example implementation.
Figure 2B:
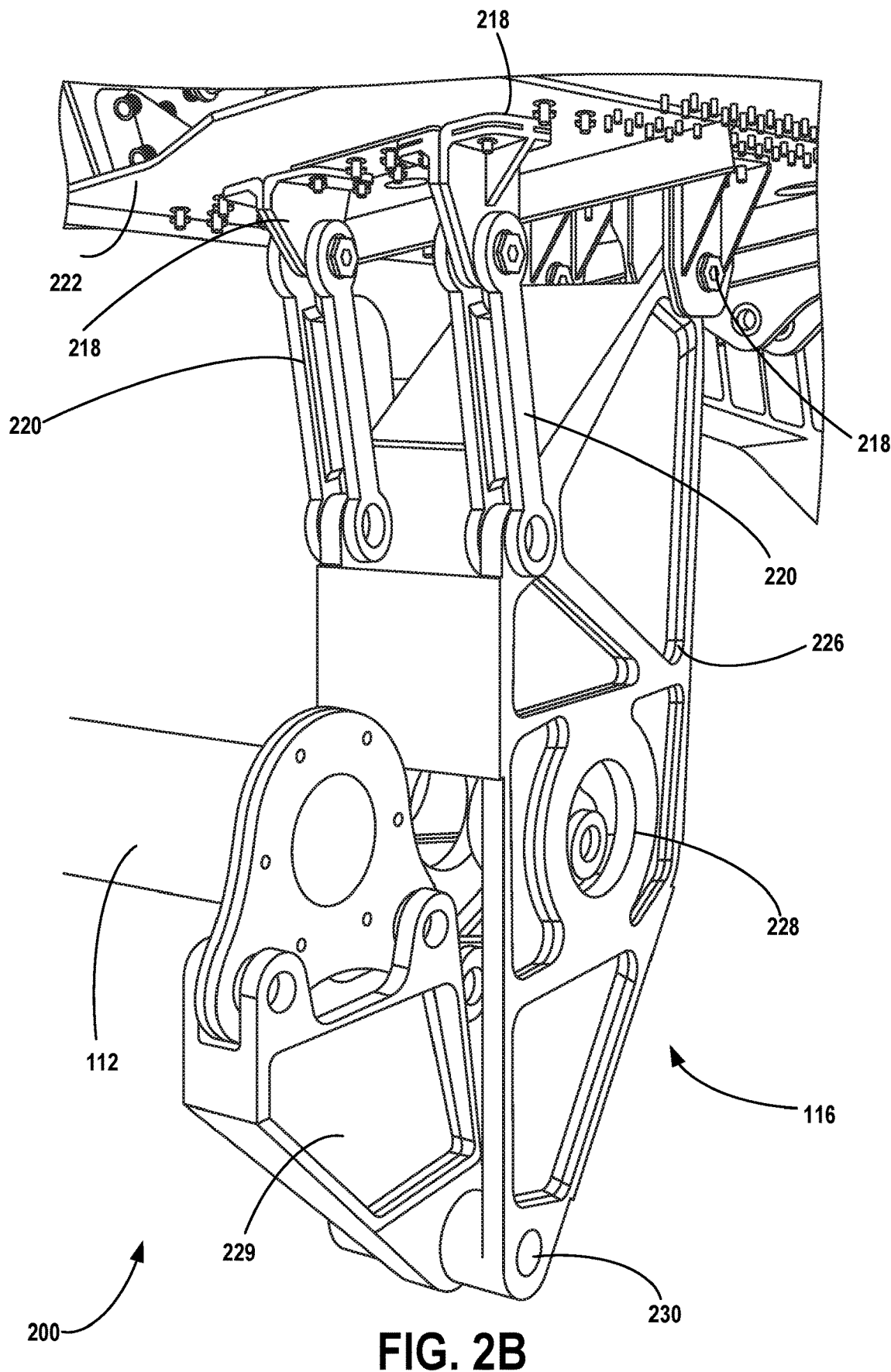
FIG. 2B is a perspective view of a flap support, according to an example implementation.
Figure 2C:
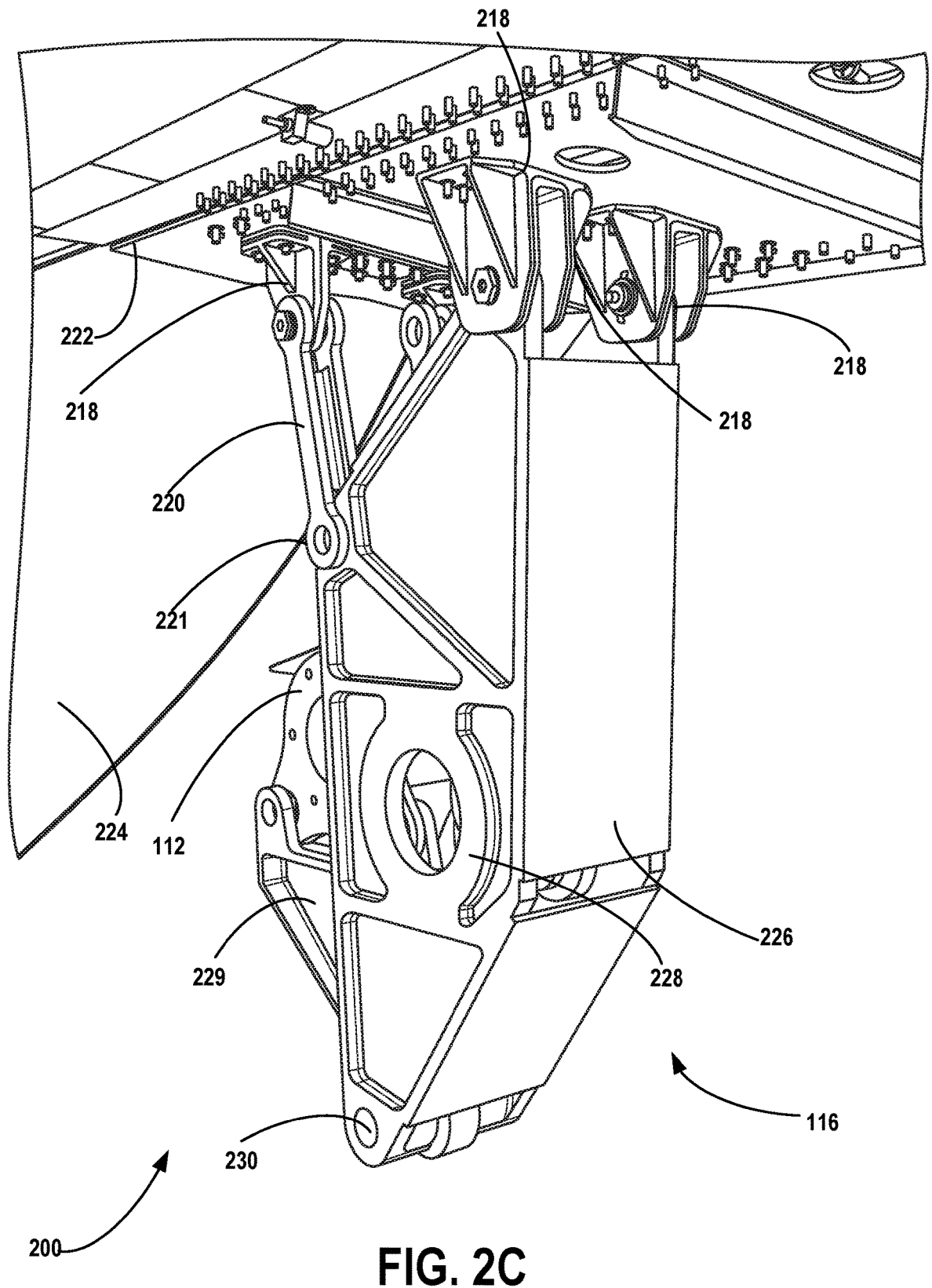
FIG. 2C is a perspective view of a flap support, according to an example implementation.

Now referring to FIG. 2A-2C, a system 200 including an inboard flap assembly 112 and a flap support 116 according to an example implementation. FIG. 2A illustrates a perspective view of the system 200. FIG. 2B illustrates another perspective view of the system 200. FIG. 2C illustrates a different perspective view of the system 200. The system includes a flap support 116, which includes a flap support body 226 and a plurality of load-bearing connection points 218 coupled to a pressure deck 222, and an inboard flap assembly 112 configured to move between an extended position and a retracted position. Additionally, the flap support 116 may include aft links 220 in which a first end of each aft link 220 is coupled to a load-bearing connection point 218 and the second end of each aft link 220 is coupled to the flap support body 226. The flap support 116 may additionally include a joint 228 rotatably coupled to a proximal end of a link, where a distal end of the aft link 220 is rotatably coupled to the inboard flap assembly 112. Rotation of the joint 228 moves the inboard flap assembly 112 between the extended position and the retracted position. The flap support 116 may house at least a portion of the inboard flap assembly 112, or an extension thereof. The pressure deck 222 is a component of the fuselage 102 and may be substantially horizontal (i.e., horizontal pressure deck).

In examples, the flap support 116 is housed within the fuselage 102 adjacent to the aircraft wing 106, which includes the substantially horizontal pressure deck 222. Further, in some examples, the flap support 116 may be disposed within the landing gear wheel well of the aircraft 100.

The flap support 116 comprises a plurality of load-bearing connection points 218. In some examples, the flap support 116 may have four load-bearing connection points 218, as shown in FIGS. 2A-2C. Many other examples are possible. Further, in some examples, all of the load-bearing connection points 218 may be attached to the horizontal pressure deck 222. Alternatively, a subset of the load-bearing connection points 218 may be attached to a substantially vertical wall 224 within the fuselage 102 (as shown in FIG. 3B). In some examples, some or all of the load-bearing connection points 218 may be lugs bolted to the horizontal pressure deck 222 from a top portion of the flap support 116 or flap support body 226.

The plurality of load-bearing connection points 218 provide redundancy for each other. In other words, if one of the load-bearing connection points 218 fails or cracks, the remaining load-bearing connection points 218 may absorb load from the defective load-bearing connection point 218. For instance, in an example where there are four load-bearing connection points 218, if one load-bearing connection point 218 fails, the remaining three load-bearing connection points 218 may still support the inboard flap assembly 112. Accordingly, having a plurality of load-bearing connection points 218 provides reliable load path redundancy as compared to known flap supports which may not have redundant supports or connection points. More specifically, known flap support designs, for example, do not always use a redundant number of supports or connection points, but may instead rely redundant features, such as back to back joints. Further, together the load-bearing connection points 218 may react along various axes (e.g., vertical, fore/aft, inboard/outboard) also providing increased reliance and stability compared to known flap supports attached to moving parts, such as the landing gear beam.

In examples where all of the load-bearing connection points 218 are attached to the horizontal pressure deck 222, the load of the flap support 116 is supported solely by the horizontal pressure deck 222 and the fuselage 102. In other words, the horizontal pressure deck 222 is the flap support's 116 primary load path. During operation, the horizontal pressure deck 222 moves significantly less than the aircraft wings 106 and the landing gear and/or landing gear beams with respect to the aircraft 100. As such, the flap support 116 having a primary load path to the horizontal pressure deck 222 will have far lower deflections during operation than it would if the primary load path was off the wings or landing gear beam. This is desirable in order to obtain more accurate analyses of the loads and deflections, as compared to the known flap support structures, which may deflect load of the flap assembly to moving parts such as the landing gear beam. In many aircrafts, the landing gear beam swings inboard and outboard during operation. A flap support attached to the landing gear beam must account for the relative deflections of the movement of the landing gear beam. More specifically, moving parts or equipment change the orientation of the flap support with respect to the equipment, which effects the stiffness of the flap support structure which may alters how loads are distributed.

Conversely, the horizontal pressure deck 222 is relatively stationary with respect to the aircraft 100 and flap support 116 during operation resulting in lower relative deflections. Further, the horizontal pressure deck 222 may be a single structure (e.g., a monolithic structure). In examples where the flap support 116 is affixed to the horizontal pressure deck 222, analyses of load and deflections may be more accurate and reliable than analyses of known methods.

Additionally, in practice, utilizing the common parts and/or materials for the plurality of load-bearing connection points 218 may be more cost effective for installation and maintenance. Further, the load-bearing connection points 218 may be installed, located, and maintained more easily than flap support structures known in the art. For example, flap support 116 may be installed earlier in the installation process than know supports attached to the wings, as flap support 116 may be installed once the horizontal pressure deck 222 and/or fuselage 102 can support it. Conversely, known flap supports attached to the aircraft wings 106 or landing gear beams are typically installed after the fuselage 102 and aircraft wings 106 are fused together which usually occurs later in the building process.

Further, in some examples, a subset of the load-bearing connection points 218 may be coupled to a first end of an aft link 220. The second end of the aft link 220 may be coupled to the flap support body 226. In some examples, the second end of the aft links 220 may be coupled to the flap support body 226 by way of the joints 221. During operation and in practice, the aft links 220 and joints 221 absorb some of the load of the inboard flap assembly 112. Additionally, the aft links 220 and joints 221 provide some manufacturing assembly tolerance. For example, the inboard flap assembly 112 moves back and forth from the retracted position to the extended position along an axis, or hinge line, by way of a lower joint 230. In some examples, the hinge line of the inboard flap assembly 112 is aligned with the plurality of load-bearing connection points 218. In practice, the length of the aft links 220 can be adjusted so as to move the location of the lower joint 230 (i.e., if the hinge line is out of alignment with respect to the load-bearing connection points 218 during assembly, the aft link 220 lengths may be adjusted to properly align the hinge line with the load-bearing connection points 218).

Figure 5:
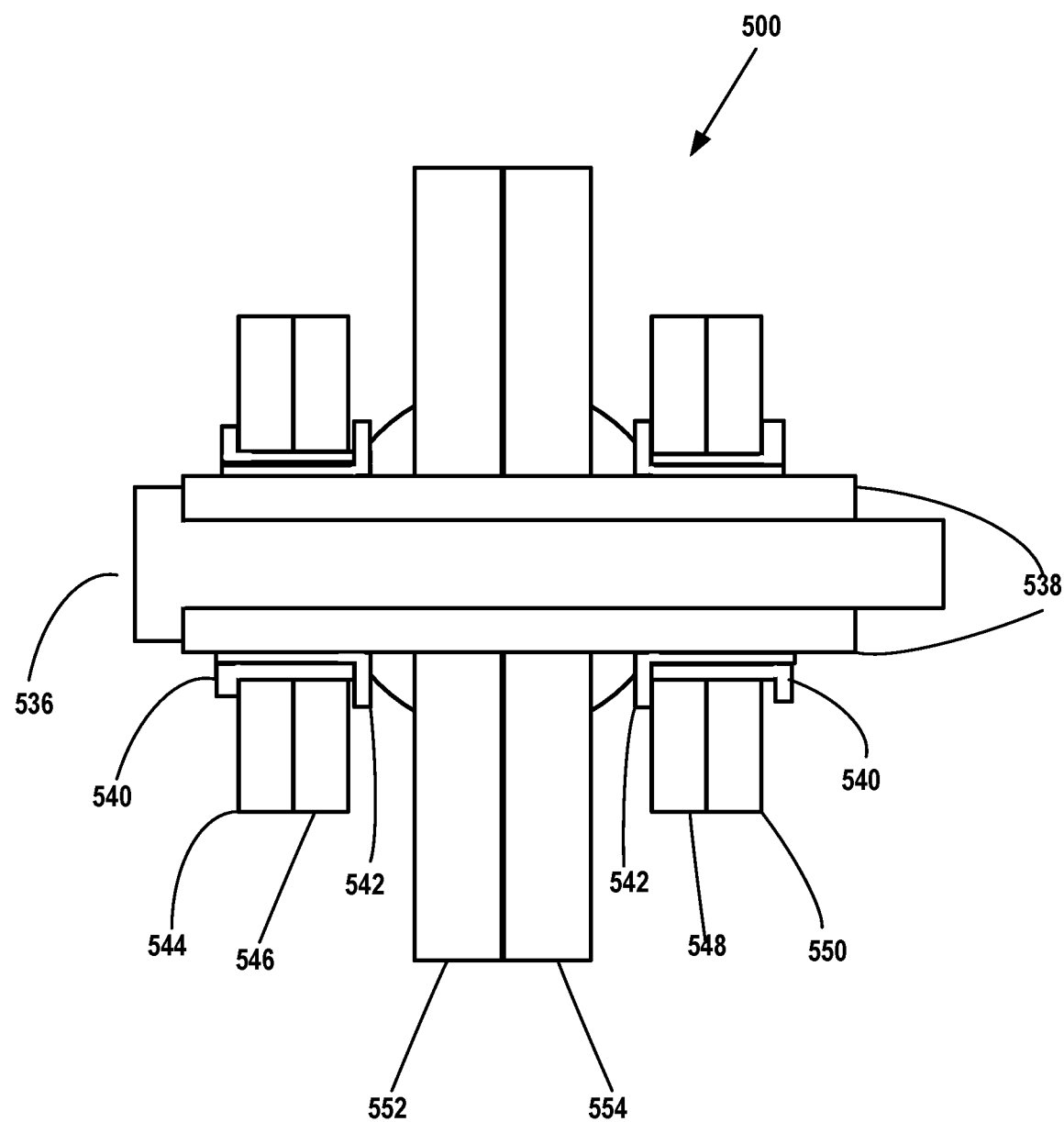
FIG. 5 is a cross-sectional view of a back to back joint, according to an example implementation.

In some examples, the load-bearing connection points 218 may include back to back joints 500 (as shown in FIG. 5). A back to back joint consists of most or every structural member of the back to back joint having an alternate load path. More specifically, if one component of the back to back joint cracks or breaks, another component can absorb the load of the failed component. As such, the back to back joints provide failsafe redundancy.

Additionally or alternatively, in some examples, the flap support 116 may additionally include a joint 228 rotatably coupled to the inboard flap assembly 112 to facilitate movement of the inboard flap assembly 112. As shown in FIGS. 2A-2C, in some examples, this joint 228 may be located in a central portion of the flap support body 226. In other examples, this joint 228 may be located in other parts of the flap support body 226. Rotation of the joint 228 results in movement of the inboard flap assembly 112, for example, from the extended position to the retracted position.

Further, in some examples, the joint 228 may work in conjunction with a lower joint 230, for example, as a four bar linkage system. In these examples, the joint 228 may be coupled to proximal end of a link. The distal end of this link may be coupled to the inboard flap assembly 112. The lower joint 230 may be rotatably coupled to a first end of an arm 229 of the flap support 116. A second end of the arm 229 of the flap support 116 is attached to the inboard flap assembly 112. The lower joint 230 may act as a hinge, allowing the arm 229 of the flap support 116 to swing away from the flap support body 226 and back. In this way, the lower joint 230 and the joint 228 located in the central portion of the flap support body 226 operate in conjunction as a four bar linkage system, allowing the inboard flap assembly 112 to move between the retracted and extended positions.

Additionally or alternatively, in some examples, the inboard flap assembly 112, or an extension thereof, is, at least partially, housed by the flap support 116. Further, in some examples, a portion the inboard flap assembly 112 may be contained within the flap support body 226 while in the retracted position. Additionally or alternatively, in some examples, the flap assembly may at least partially be housed by the flap support body 226. Many example configurations are possible.

Now referring to FIG. 3A, another example of a flap support 116. Similar to the example shown in FIGS. 2A-2C, flap support 116 includes a flap support body 226 and a plurality of load-bearing connection points 218 coupled to the horizontal pressure deck 222.

In this example, the flap support 116 may additionally include lugs attached to each of the load-bearing connection points 218, instead of by way of aft links 220, as shown in FIGS. 2A-2C. The lugs 332 may provide additional support to the flap support 116, as compared to flap supports 116 including aft links 220. Additionally, the load reacted at these load-bearing connection points 218 may not be dependent on any orientation. Accordingly, failure of a load-bearing connection point 218 would likely not result in rotation of the flap support 116. As such, in some examples, some or all of the load-bearing connection points 218 may not require back to back joints (as shown in FIG. 5).

The load-bearing connection points 218, in conjunction with the lugs 332, provide failsafe redundancy. Additionally, as explained above with respect to the example shown in FIGS. 2A-2C, analyses of load and deflections may be more accurate and reliable than analyses of known methods because the load-bearing connection points 218 are supported by and deflect loads to the horizontal pressure deck 222.

Now referring to FIG. 3B, another example of a flap support 116. Similar to the example shown in FIGS. 2A-2C, flap support 116 includes a flap support body 226 and a subset of the plurality of load-bearing connection points 218 coupled to the horizontal pressure deck 222.

In this example, a subset of the load-bearing connection points 218 may be coupled to the vertical wall 224 of a landing gear wheel well. As such, the vertical wall 224 of the landing gear wheel well supports the flap support 116 and absorbs some of the load, along with the horizontal pressure deck 222. Additionally, similar to the examples shown in FIGS. 2A-2C, a subset of the load-bearing connection points 218 may be coupled to a first end of an aft link 220. The second end of the aft link 220 may be coupled to the flap support body 226. As explained above, during operation and in practice, the aft links 220 may absorb some of the load of the inboard flap assembly 112.

In this example, the load on the horizontal pressure deck 222 is lesser than examples shown in FIGS. 2A-C and 3A because the vertical wall 224 of the landing gear wheel well absorbs some of the load of the flap support 116. Additionally, the load on the horizontal pressure deck 222 may be reduced because the distance between the load-bearing connection points 218 on the vertical wall 224 of the landing gear wheel well and the load-bearing connection points 218 on the horizontal pressure deck 222 is greater as compared to other example configurations. As such, a reinforcement structure 434 (shown in FIG. 4) may not be necessary in some examples.

Alternatively, in some examples, a subset of the load-bearing connection points 218 may include lugs attached to the vertical wall 224 and the flap support body 226. Many other examples and configurations are possible.

Figure 4:
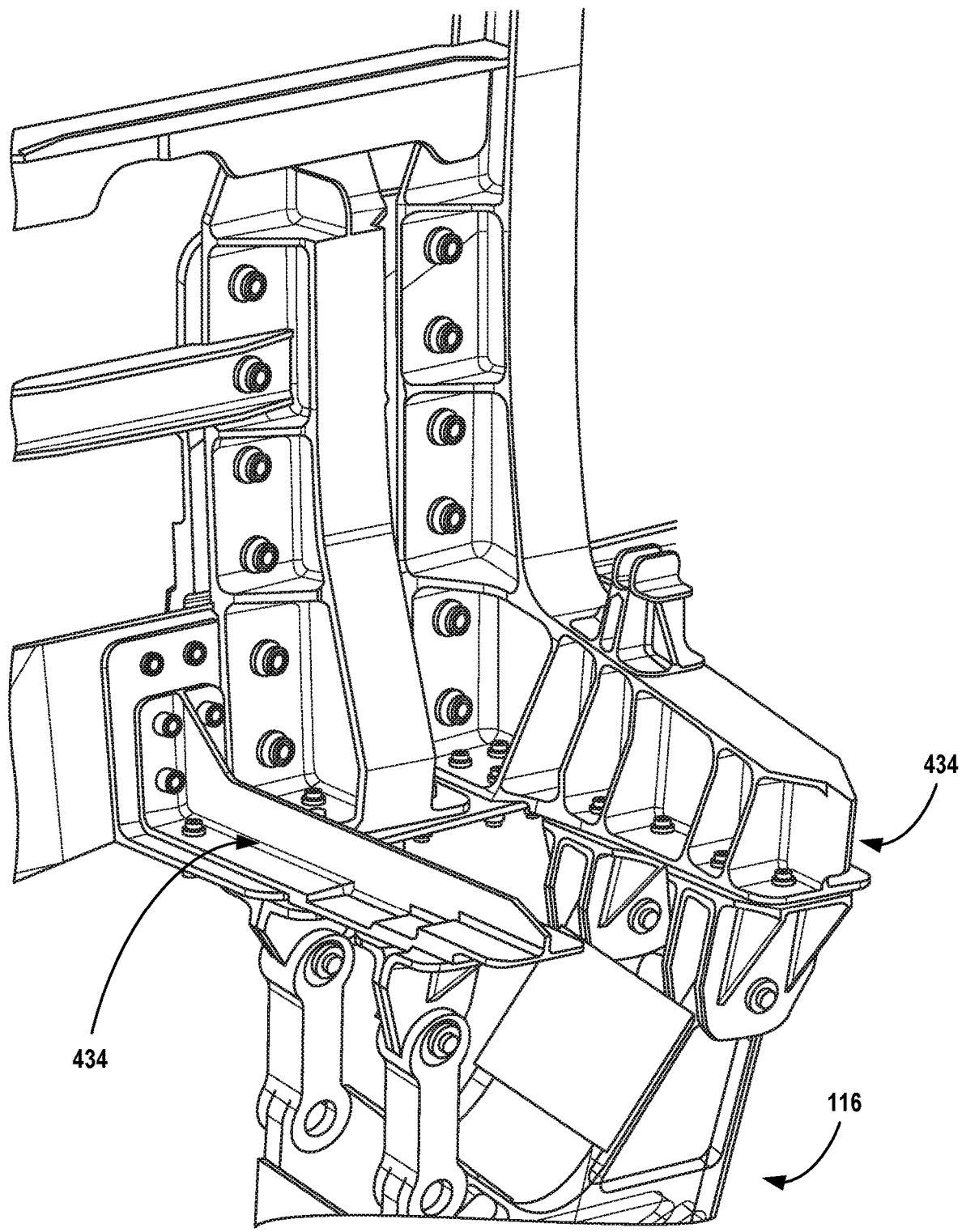
FIG. 4 is a perspective view of a reinforcement structure, according to an example implementation.

Referring now to FIG. 4, an example of a reinforcement structure 434. In some examples, the reinforcement structure 434 may be above the flap support 116 and the horizontal pressure deck 222 and align with the plurality of load-bearing connection points 218. The reinforcement structure 434 may be part of the horizontal pressure deck 222. Alternatively, the reinforcement structure may be an additional structure on top of the horizontal pressure deck 222. In either example, the load-bearing connection points 218 are attached to the reinforcement structure 434 and may transfer load to the reinforcement structure 434. Namely, the reinforcement structure 434 provides additional support for the horizontal pressure deck 222. Further, the reinforcement structure 434 may be a monolithic structure.

Referring now to FIG. 5, a cross-sectional view of a back to back joint 500, according to an example. A back to back joint 500 consists of most or all structural members having an alternate or redundant load path. Namely, if a structural component is damaged or cracks, for example, there is a duplicate structural component and/or an alternative component to absorb the load of the damaged or cracked component.

More specifically, a back to back joint 500 may include, for example, an outer pin 538 surrounding an inner pin 536. In practice, if the outer pin 538 fails, the inner pin 536 may absorb the load of the outer pin 538.

In some examples, the back to back joint 500 may additionally include inner bushing components 542 and outer bushing components 540. Similar to the inner pin 536 and outer pin 538, if any of the inner bushing components 542 crack or fail, the corresponding outer bushing components 540 may absorb the load of the inner bushing components 542.

Further, in some examples, the back to back joint 500 may include inner bearing carrier fittings 554 and outer bearing carrier fittings 552, inner bearing failsafe chords 548 and outer bearing failsafe chords 546, and inner bearing ribs 550 and outer bearing ribs 544, each of which provide failsafe redundancy for the corresponding component in the back to back joint 500.

In some examples, each of the load-bearing connection points 218 includes back to back joints 500. Alternatively, in some examples, only a subset of load-bearing connection points 218 may include back to back joints 500 (e.g., two of four load-bearing connection points 218 include back to back joints 500). In one example, only the load-bearing connection points 218 attached to the aft links 220 may include the back to back joints. In another example, only the load-bearing connection points 218 attached to the main body of the flap support 116 include back to back joints. Many other examples and variations are possible.

Figure 6:
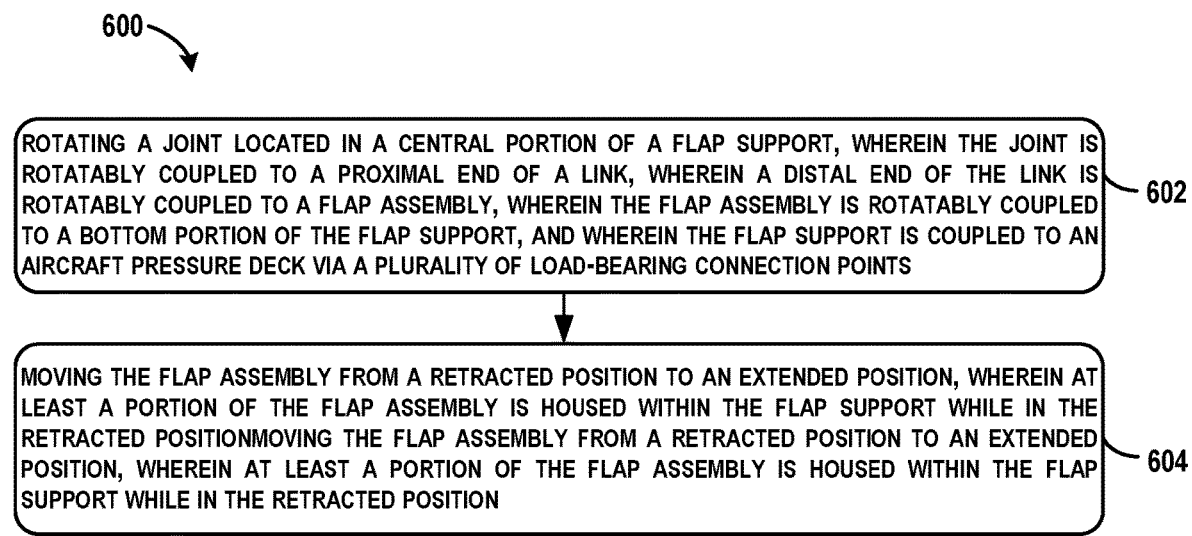
FIG. 6 shows a flowchart of an example method for deploying a wing flap, according to an example implementation.

Referring now to FIG. 6, a flowchart of an example of a method 600 of moving the flap assembly by way of the flap support, according to an example implementation. Method 600 shown in FIG. 6 presents an example of a method that could be used in an aircraft, as shown in FIG. 1. Further, devices or systems may be used or configured to perform logical functions presented in FIG. 6. In some instances, components of the devices and/or systems may be configured to perform the functions such that the components are actually configured and structured to enable such performance. In other examples, components of the devices and/or systems may be arranged to be adapted to, capable of, or suited for performing the functions, such as when operated in a specific manner. Method 600 may include one or more operations, functions, or actions as illustrated by one or more of blocks 602-604. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 involves rotating a joint located in a central portion of a flap support, wherein the joint is rotatably coupled to a proximal end of a link, wherein a distal end of the link is rotatably coupled to a flap assembly, wherein the flap assembly is rotatably coupled to a bottom portion of the flap support, and wherein the flap support is coupled to an aircraft pressure deck via a plurality of load-bearing connection points.

At block 604, method 600 involves moving the flap assembly from a retracted position to an extended position, wherein at least a portion of the flap assembly is housed within the flap support while in the retracted position.

Each of the methods described herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An aircraft comprising:
    a fuselage comprising a pressure deck, wherein at least a portion the pressure deck is substantially horizontal;
    a wing extending from the fuselage, wherein the wing comprises a leading edge and a trailing edge;
    a flap assembly on the trailing edge of the wing, wherein the flap assembly is configured to move between an extended position and a retracted position; and
    a flap support coupled to the flap assembly comprising a plurality of load-bearing connection points, wherein at least one of the load-bearing connection points is coupled to the pressure deck within the fuselage.

2. The aircraft of claim 1 further comprising a landing gear wheel well, wherein the flap support is at least partially disposed within the landing gear wheel well.

3. The aircraft of claim 1, wherein the flap support comprises at least four load-bearing connection points each coupled to the portion of the pressure deck that is substantially horizontal.

4. The aircraft of claim 1, wherein the portion of the pressure deck that is substantially horizontal is a monolithic structure, and wherein each of the load-bearing connection points are coupled to the monolithic structure.

5. The aircraft of claim 1, wherein the fuselage comprises a substantially vertical wall adjacent to the pressure deck, and wherein a first subset of the load-bearing connection points are coupled to the pressure deck and a second subset of the load-bearing connection points are coupled to the substantially vertical wall.

6. The aircraft of claim 1, wherein each of the load-bearing connection points comprise back to back joints.

7. The aircraft of claim 1, wherein the plurality of load-bearing connection points are coupled to the pressure deck via lugs.

8. The aircraft of claim 1, wherein the flap support comprises a body, and wherein each of the load-bearing connection points within a subset of the plurality of load-bearing connection points is coupled to a first end of a link, wherein a second end of the link is coupled to the body of the flap support.

9. The aircraft of claim 1, wherein the pressure deck further comprises a reinforcement structure, wherein the reinforcement structure aligns with the plurality of load-bearing connection points, and wherein the plurality of load-bearing connection points are coupled to the reinforcement structure.

10. The aircraft of claim 1, wherein the flap support houses a joint rotatably coupled to a proximal end of a link, wherein a distal end of the link is rotatably coupled to the flap assembly, and wherein rotation of the joint moves the flap assembly between the extended position and the retracted position.

11. The aircraft of claim 10, wherein the load-bearing connection points are on a top portion of the flap support, the joint is a central portion of the flap support, and the flap assembly is rotatably coupled to a bottom portion of the flap support.

12. The aircraft of claim 10, wherein the flap support houses at least a portion of the flap assembly while the flap assembly is in the retracted position.

13. A system comprising:
a flap assembly configured to move between an extended position and a retracted position; and
a flap support comprising:
a joint rotatably coupled to a proximal end of a link, wherein a distal end of the link is rotatably coupled to the flap assembly, and wherein rotation of the joint moves the flap assembly between the extended position and the retracted position; and
a plurality of load-bearing connection points, wherein at least one of the load-bearing connection points is configured to be coupled to a fuselage pressure deck within the fuselage.

14. The system of claim 13, wherein at least a portion of the fuselage pressure deck is substantially horizontal, and wherein the flap support comprises at least four load-bearing connection points each configured to be coupled to the portion of the fuselage pressure deck that is substantially horizontal.

15. The system of claim 13, wherein each of the load-bearing connection points comprise back to back joints.

16. The system of claim 13, wherein the plurality of load-bearing connection points are configured to be coupled to the fuselage pressure deck via lugs.

17. The system of claim 13, wherein the load-bearing connection points are on a top portion of the flap support, the joint is a central portion of the flap support, and the flap assembly is rotatably coupled to a bottom portion of the flap support.

18. The system of claim 13, wherein the flap support houses at least a portion of the flap assembly while the flap assembly is in the retracted position.

19. The system of claim 13, wherein the flap support comprises a body, wherein each of the load-bearing connection points within a subset of the plurality of load-bearing connection points is coupled to a first end of an aft link, wherein a second end of the aft link is coupled to the body of the flap support.

20. A method comprising:
rotating a joint located in a central portion of a flap support, wherein the joint is rotatably coupled to a proximal end of a link, wherein a distal end of the link is rotatably coupled to a flap assembly, wherein the flap assembly is rotatably coupled to a bottom portion of the flap support, and wherein the flap support is coupled to an aircraft pressure deck within a fuselage via a plurality of load-bearing connection points; and
moving the flap assembly from a retracted position to an extended position, wherein at least a portion of the flap assembly is housed within the flap support while in the retracted position.

\* \* \* \* \*